Nov. 23, 1948.     W. H. LERNER     2,454,286
DIP TANK FOR THERMOPLASTIC MATERIAL
Filed Oct. 4, 1944     2 Sheets-Sheet 1

INVENTOR.
William H. Lerner,
BY McCaleb Wendt + Dickinson
Attys.

Nov. 23, 1948.   W. H. LERNER   2,454,286
DIP TANK FOR THERMOPLASTIC MATERIAL
Filed Oct. 4, 1944   2 Sheets-Sheet 2

INVENTOR.
William H. Lerner,
BY McCaleb, Wendt & Dickinson
Atty's.

Patented Nov. 23, 1948

2,454,286

UNITED STATES PATENT OFFICE 2,454,286

DIP TANK FOR THERMOPLASTIC MATERIAL

William H. Lerner, Lorain, Ohio, assignor, by mesne assignments, to Specialties Development Corporation, Belleville, N. J., a corporation of New Jersey Application October 4, 1944, Serial No. 557,137

3 Claims. (Cl. 91—46)

This invention relates to a process and apparatus for handling thermoplastics employed for dip coating.

The process and apparatus herein disclosed are not limited to the use of any particular thermoplastic material, but contemplate the use of a material which is solid at normal temperatures and melts at a temperature somewhat above the normal range.

To avoid deterioration of the thermoplastic material during handling, it is usually desirable to maintain its temperature between predetermined limits and to avoid overheating generally and at localized parts of the mass, and it is highly desirable to avoid extended exposure to the air of stagnant surfaces of the molten plastic.

Another consideration accompanying the coating of articles by dipping in molten thermoplastic material is that the thickness of the coating is controlled by the temperature of the dipping bath. As a consequence, maintenance of a uniform temperature is essential to uniform coating thickness, and the selection and maintenance of the proper temperature are factors tending to avoid waste of material.

In order to bring a mass of thermoplastic material to a molten state without localized overheating, the heating must be gradual. However, the heating rate may be improved by limiting the mass of the thermoplastic material which is heated by each unit of heating surface. In other words, a low ratio of volume heated to heating surface area is conducive to more rapid heating.

After the molten state of the thermoplastic is reached, uniformity of temperature throughout the mass is promoted by forced circulation of the molten plastic. In addition, uniformity of heating and temperature are more readily maintained in use by preheating and melting of the thermoplastic material which is added for replacement of material used.

During the use of the thermoplastic material, bubbles are to be guarded against and extended exposure of a stagnant surface of the material to air should be avoided. Circulation of the material, including that on the surface, avoids a stagnant exposed surface. However, the circulation or agitation should not be sufficiently violent or of a nature such as to produce bubbles in the material. On the contrary, it is desirable that the circulation or agitation should clear the material of bubbles caused in use and prolong the useful life and efficiency of the material by maintaining uniform temperature and preventing film formation on a stagnant surface.

It is therefore a general object of this invention to provide a process and apparatus for handling thermoplastic material in which the foregoing considerations are severally and summarily taken into account.

Another and more specific object of the invention is to provide a process and apparatus for handling thermoplastic material which is used more or less continuously in the coating of articles by dipping.

The invention has for another object the provision of apparatus for maintaining thermoplastic material in a substantially uniform molten condition during use and for providing a continuously flowing exposed surface of the molten material.

An additional object of the invention is to provide apparatus for handling thermoplastic material in which the working level in one part of the apparatus is maintained by forcing circulation of molten material into that part of the apparatus at a rate greater than the rate of use therefrom and discharging the excess material over a weir for reheating and recirculation.

A further object of the invention is to provide apparatus for handling and using thermoplastic material in which the molten material is continually circulated during use through a cycle which minimizes the formation of bubbles and tends to break any bubbles which may be formed.

Another object of the invention is to provide apparatus for handling molten thermoplastic material in which the molten material is pumped from a conditioning chamber to the point of use, and the excess material flows by gravity back to the conditioning chamber.

It is another object of the invention to provide an efficient and effective system for heating thermoplastic material and maintaining temperature uniformity.

Other objects and advantages of the invention will be apparent from the following description and the accompanying drawings in which similar characters of reference indicate similar parts throughout the several views.

Figure 1:
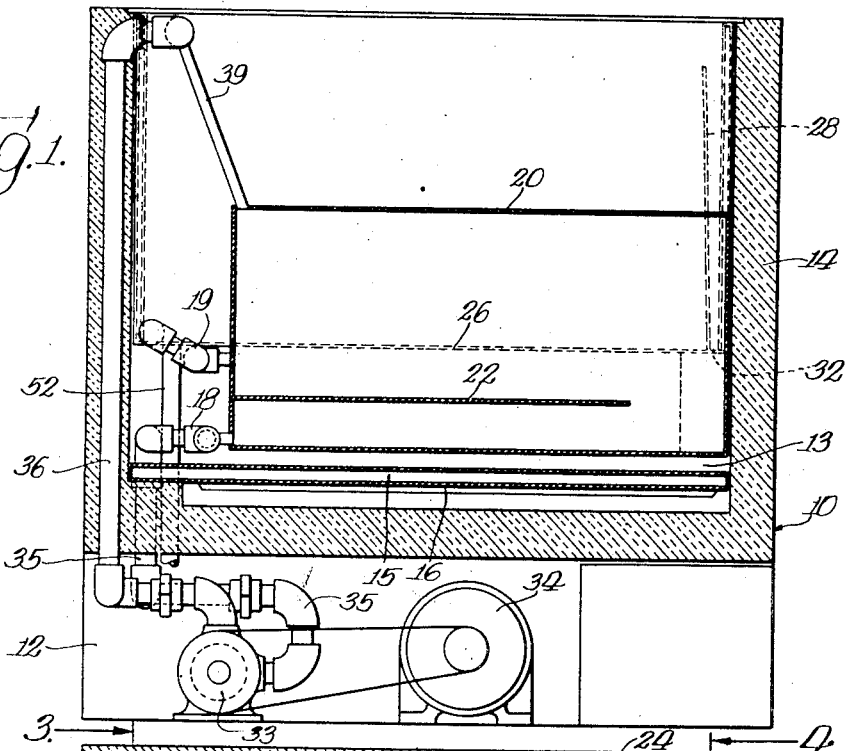
Figure 1 is a side sectional view of apparatus embodying the invention in a preferred form, and in which the section is taken substantially on a line 1—1 of Fig. 2.
Figure 2:
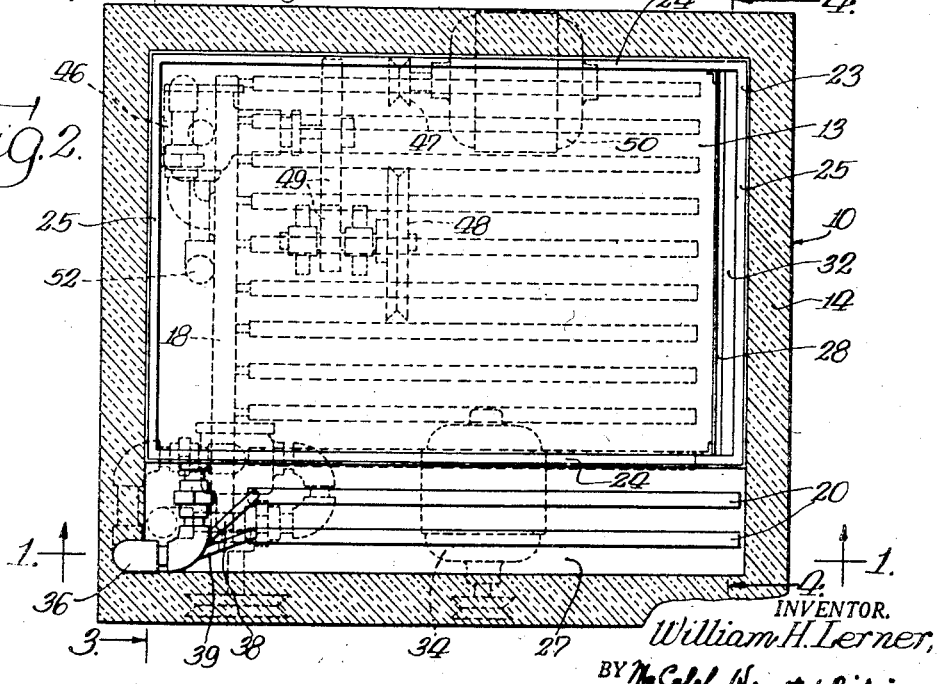
Fig. 2 is a top plan view of the apparatus shown in Fig. 1.
Figure 3:
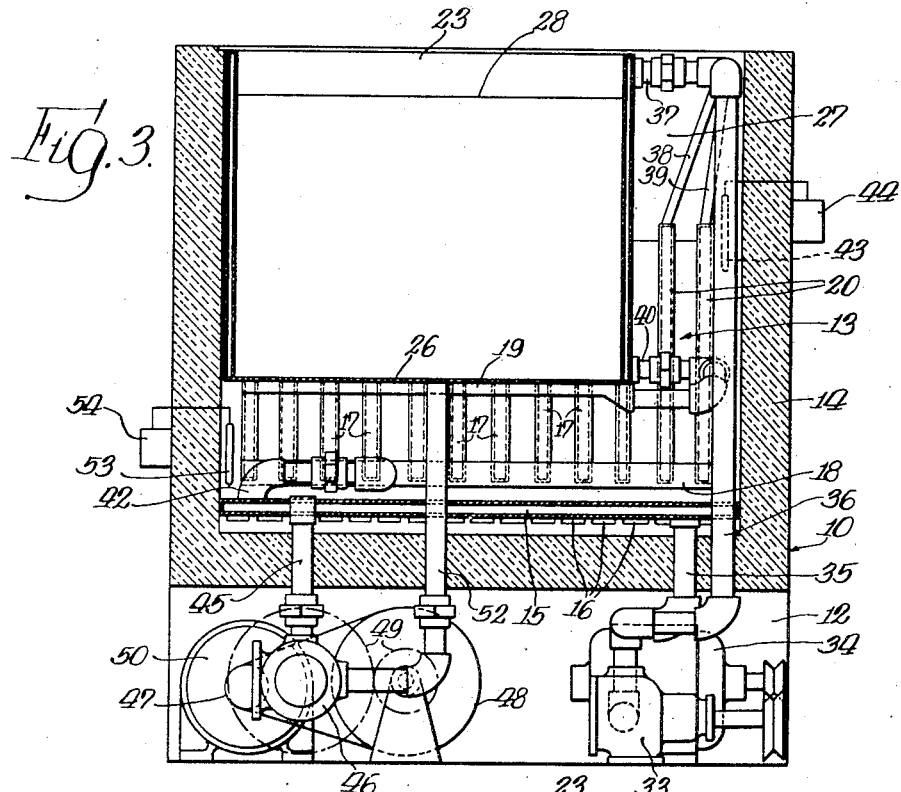
Figure 4:
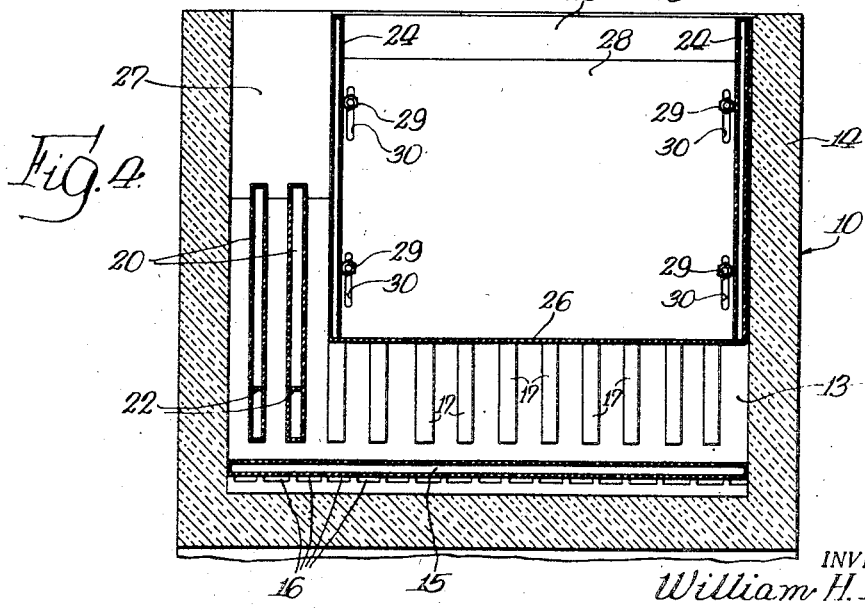

Fig. 3 is an end sectional view of the apparatus shown in Figs. 1 and 2, with the section taken substantially on a line 3—3 of Fig. 2; and Fig. 4 is a fragmentary sectional view of a portion of the apparatus with the section taken substantially on a line 4—4 of Fig. 2.

Referring to the exemplary embodiment of the invention illustrated in the two sheets of drawings, a housing 10 provides a support for the apparatus and has a lower compartment 12 and an upper compartment 13, which upper compartment is open at the top and otherwise covered with a coating of heat insulating material 14.

The upper compartment 13 is adapted to hold thermoplastic material in a molten state and has at its bottom a hollow heating unit 15, on the lower surface of which is mounted a series of heating elements 16, such as electrically heated resistance strips in heat transferring relation to the unit. Above the heating unit 15 is mounted a plurality of heating pads 17 which extend across the lower portion of the compartment 13 in spaced relation with respect to the heating unit 15 and in substantially parallel relation to each other. The heating pads 17 are hollow and desirably are baffled internally to lengthen the path for circulation therethrough of a suitable heating fluid. Headers 18 and 19 extending transversely with respect to the ends of the heating pads 17 provide communicating channels through which fluid flow connections are made to the heating pads. At one side of the compartment 13 two larger heating pads 20 are mounted in parallel relation with respect to the heating pads 17 and connected to the header 18 to serve as preheating units. The heating units 20 are hollow so that heating fluid flows therethrough and desirably include baffles 22 which improve and lengthen the path of circulation of the heating fluid.

A dip tank 23 having hollow side walls 24 and end walls 25 is mounted in the compartment 13 with its bottom 26 resting on the upper surfaces of the heating pads 17. The dimensions of the dip tank 23 are desirably such that it extends entirely across the compartment 13 in one direction and is spaced from one side of the compartment 13 to provide a preheating chamber 27 adjacent and above the heating units 20.

Near one end of the dip tank 23 a weir plate 28 extends thereacross parallel to the end thereof and is secured in position, with its top surface below the level of the sides and ends of the tank, by bolts 29 or other suitable fastening means. Since it is sometimes desirable to vary the depth of the material contained in the dip tank, the bolts 29 extend through slots 30 (Fig. 4) in the weir plate. As illustrated in Figs. 1 and 2, an opening 32 is provided in the bottom of the dip tank between the weir plate 28 and the adjacent end of the tank, which opening provides a communicating drain from the dip tank to the lower portion of the compartment 13.

The selection of a heating fluid for maintaining the heated thermoplastic material at a desired temperature is dependent somewhat upon the characteristics of the thermoplastic. When it is contemplated that articles shall be coated by dipping in an ethyl cellulose compound which has a satisfactory dipping temperature of approximately 375° F., oil is a satisfactory heat carrying fluid.

Circulation of oil through the heating unit 15 and pads 17 and 20 is effected by a pump 33 mounted in the lower compartment 12 of the housing 10 and driven by a motor 34. The heating system, including the heating unit 15 and pads 17 and 20, is filled with the heat carrying fluid, such as oil, and is usually provided with a connected expansion tank (not shown) in which the level may vary to compensate for variations in the volume of the heating fluid due to temperature changes.

The heating fluid such as oil is heated in the heating unit 15 by the heating elements 16 and is pumped therefrom through a pipe 35 which connects the heating unit 15 to the intake side of the pump 33. The output side of the pump 33 is connected through a feeder pipe 36 and branch pipes 37, 38 and 39 to the hollow side walls of the dip tank 23 and to the preheating pads 20; the branch pipe 37 providing the connection to the walls of the dip tank and the branch pipes 38 and 39 providing the connections to the preheating pads 20. The branch pipe 37 through which the heating fluid flows to the walls of the dip tank 23 is desirably connected to one of the dip tank walls near the top of the tank, while an oil drain pipe 40 is connected to such dip tank wall near the bottom of the tank. Through the pipe 40 the heating fluid flows from the dip tank walls to the header 19 and thence through the heating pads 17 to the header 18. A pipe 42 connects the header 18 to the heating unit 15 to complete the circuit of flow for the heating fluid.

A temperature responsive element 43 is mounted at any suitable position in the circuit of flow of the heating fluid, such as in the pipe 36, as shown in Fig. 3, to actuate a switch 44 in response to the temperature of the circulated fluid and thereby to control automatically the operation of the heating elements 16 so as to prevent overheating of the thermoplastic material.

Although it is understood that other types of heating pads or other methods of heating the thermoplastic material may be employed and that different arrangements of the heating pads may be utilized, there are certain general considerations of the design and arrangement of the heating pads which are desirable. For instance, the surface area of the heating pads is desirably large in proportion to the volume of the pads. To accomplish this, the heating pads are thin in section so that the volume of oil contained in each pad is relatively small and its surface area is large. The preference of large surface area results from the desirability of transferring heat to a relatively large amount of thermoplastic material in a short time without danger of overheating the thermoplastic material adjacent the heating pads. A relatively large number of the heating pads is also conducive to the heating of a large volume of the thermoplastic material in a short time without the necessity of transferring heat too rapidly through the pads. The continuous forced circulation of the heating fluid, which is effected by the operation of the pump 33, tends to maintain a uniformity of the heating fluid temperature through the system.

Thermoplastic material in the lower part of the compartment 13 is heated to a molten state by the heating pads 17. The molten thermoplastic material is pumped from the lower portion of the compartment 13 through a pipe 45 which extends into that compartment and is connected to a pump 46, which pump is driven through a drive mechanism, including pulleys 47 and 48 and gears 49, by a motor 50; the drive mechanism being indicated by dotted lines in Fig. 2. The output side of the pump 46 is connected to a pipe 52 which extends through the bottom of the dip tank 23, so that the molten material from the lower portion of the compartment 13 is pumped into the bottom of the dip tank 23 opposite weir plate 28.

In order to prevent the starting of the motor 50 and the resulting operation of the thermoplastic pump 46 before the thermoplastic material becomes sufficiently fluid to flow, a temperature responsive element 53 is placed at a suitable position in the lower portion of the compartment 13 and controls a switch 54, which in turn controls the operation of the motor 50. In Fig. 3, the temperature responsive element 53 is shown near the pipe 45 leading to the pump 46.

When new material is added in the solid state to replace that used as dip coats from the dip tank 23, it is desirably placed in the preheating chamber 27 on top of the heating pads 20 so that the new material is melted by the heating pads 20 and flows into the lower portion of the compartment 13 for mixture with the hot material. This preheating of the added material prevents chilling of a portion of the heated material. In the disclosed arrangement of parts, the preheating chamber is within the compartment 13 on the side thereof opposite the pipe 45 through which the heated material is pumped to the dip tank.

In the preferred operation of the disclosed apparatus, the molten thermoplastic material is pumped from the re-heating chamber in the lower portion of the compartment 13 and into the dip tank 23 at a rate which somewhat exceeds the normal rate of use of the material from the dip tank. As a result, the excess of unused material overflows the weir plate 28 and drains back into the compartment 13 through the opening 32. Although the thermoplastic material is heated at the bottom of the dip tank by the heating pads 17, as well as by the flow of heating fluid through the hollow walls of the tank, it is desirable that the molten material circulate back through the re-heating chamber in the lower portion of the compartment 13 to maintain uniform temperature of the thermoplastic throughout the system and to prevent the continued exposure of the surface material in the dip tank to the air. The separation from the weir plate 28 of the pipe 52 through which the material is forced into the dip tank, and the directions of flow to and from the dip tank effect a circulation in the tank which moves the material on the surface continually towards the weir. The flow of material over the weir carries away bubbles which may be formed in the molten thermoplastic material, due to causes such as dipping of articles for coating. Forced circulation effected by a pump in the described manner does not have a tendency to cause bubbles in the thermoplastic material such as might be caused by violent agitation. Also, the weir is desirably wide and so related in size to the rate of flow produced by the pump 46 that the material flows over the weir in a relatively thin film and bubbles are broken.

From the foregoing description, it will be readily understood that the disclosed invention provides for the controlled heating of thermoplastic material in a manner which maintains uniform operating temperatures in an efficient manner without the likelihood of over heating portions of the material either during the preliminary heating or the continued operation. In addition, the flow of material through the dip tank and over the weir not only assists in the maintenance of a uniform and satisfactory temperature of the material in the dip tank for uniform coating by the dipping process, but also tends to remove bubbles and prevent excessive exposure of a stagnant surface of the molten material to the air. The factors including the maintenance of uniformity of the temperature at a proper value in the dip tank and the elimination of bubbles contribute materially to the successful dip coating of articles in continuous production processes.

While I have illustrated a preferred embodiment of the apparatus of my invention, many modifications thereof may be made without departing from the spirit of my invention, and I do not wish to be limited to the details of construction set forth, but desire to avail myself of all changes within the scope of the appended claims.

Having thus described my invention, what I claim as new and desire to secure by Letters Patent of the United States is:

1. Apparatus for handling thermoplastic material comprising, in combination, a housing having heat insulating walls, a first container within said housing having an open top and adapted to hold a supply of thermoplastic material, a plurality of heating elements mounted near the bottom of said container and extending across the container in spaced relation, a second container having an open top and hollow walls, said second container being smaller than the first container and being mounted along one side of the first container above said heating elements, said second container also having a weir in one wall adjustable to various positions below the level of the walls thereof and adapted to discharge into the first container, additional heating elements extending along one side of the second container within the first container to provide a preheating space for unmelted replacement thermoplastic material, indirect heating means for the thermoplastic material including said heating elements and means for circulating heated fluid through said heating elements and said hollow walls, and means for pumping molten thermoplastic material from said first container into the second container for use from the second container and at a rate such that unused material continually flows back to the first container over said weir.

2. Apparatus for handling thermoplastic material comprising, in combination, a housing having heat insulating walls, a first container within said housing having an open top and adapted to hold a supply of thermoplastic material, a plurality of heating elements mounted near the bottom of said container and extending across the container in spaced relation, a second container having an open top, said second container being smaller than the first container and being mounted in the first container above said heating elements, said second container also having a weir in one wall below the level of the other walls thereof and adapted to discharge into the first container, additional heating elements extending along one side of the second container within the first container to provide a preheating space for unmelted replacement thermoplastic material, indirect heating means for the thermoplastic material including said heating elements and means for circulating heated fluid through said heating elements, and means for pumping molten thermoplastic material from said first container into the second container for use from the second container and at a rate such that unused material continually flows back to the first container over said weir.

3. Apparatus for handling thermoplastic material comprising, in combination, a housing having heat insulating walls, a first container within said housing adapted to hold a supply of thermoplastic material, a plurality of heating elements mounted near the bottom of said container and extending across the container in spaced relation, a second container having an open top, said second container being smaller than the first container and being mounted in the first container above said heating elements, said second container also having a weir in one wall below the level of the other walls thereof and adapted to discharge into the first container, indirect heating means for the thermoplastic material including said heating elements and means for circulating heated fluid through said heating elements, and means for pumping molten thermoplastic material from said first container into the second container and at a rate such that unused material continually flows back to the first container over said weir.

WILLIAM H. LERNER.

REFERENCES CITED

The following references are of record in the file of this patent:

UNITED STATES PATENTS

| Number | Name | Date |
|---|---|---|
| 498,775 | Edwards | June 6, 1893 |
| 1,191,216 | Nivling | July 18, 1916 |
| 1,407,729 | Buckminster | Feb. 28, 1922 |
| 1,943,450 | Molyneaux | Jan. 16, 1934 |
| 2,119,720 | Reifsnyder | June 7, 1938 |
| 2,127,180 | Mandell | Aug. 16, 1938 |
| 2,128,028 | Hampton | Aug. 23, 1938 |
| 2,133,390 | Kotcher et al. | Oct. 18, 1938 |
| 2,195,670 | Ferngren | Apr. 2, 1940 |
| 2,220,943 | Murch | Nov. 12, 1940 |

FOREIGN PATENTS

| Number | Country | Date |
|---|---|---|
| 264,079 | Great Britain | Jan. 13, 1927 |
| 480,206 | Great Britain | Feb. 18, 1938 |